(12) United States Patent
Kang (10) Patent No.: US 7,783,202 B2
(45) Date of Patent: Aug. 24, 2010

(54) ALL-OPTICAL METHODS AND SYSTEMS

(75) Inventor: Inuk Kang, Freehold, NJ (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 0 days.

(21) Appl. No.: 12/497,959

(22) Filed: Jul. 6, 2009

(65) Prior Publication Data
US 2009/0273821 A1  Nov. 5, 2009

Related U.S. Application Data

(63) Continuation-in-part of application No. 11/162,938, filed on Sep. 28, 2005, now Pat. No. 7,558,486.

(51) Int. Cl.
*H04B 10/16* (2006.01)

(52) U.S. Cl. .................. 398/176; 398/180; 398/201; 398/213

(58) Field of Classification Search ............... 398/176, 398/180, 201, 213
See application file for complete search history.

(56) References Cited

U.S. PATENT DOCUMENTS

| | | | |
|---|---|---|---|
| 7,057,785 B2* | 6/2006 | Webb et al. ............. | 359/245 |
| 2005/0219066 A1* | 10/2005 | Bhardwaj et al. ........ | 341/13 |

* cited by examiner

*Primary Examiner*—Leslie Pascal
(74) *Attorney, Agent, or Firm*—Brosemer, Kolefas & Assoc.

(57) ABSTRACT

An all-optical modulation format converter for converting optical data signals modulated in an on-off-keying (OOK) format to a phase-shift-keying (PSK) format. The OOK-to-PSK converter can be coupled to a delay-line interferometer to provide an all-optical wavelength converter for differential PSK (DPSK). The OOK-to-PSK converter can also be used in all-optical implementations of various functions, including, for example, exclusive-OR (XOR/NXOR) and OR logic, shift registers, and pseudo-random binary sequence (PRBS) generators.

9 Claims, 8 Drawing Sheets

*FIG. 8*

ALL-OPTICAL METHODS AND SYSTEMS

CROSS-REFERENCES

This application is a continuation-in-part application of U.S. patent application Ser. No. 11/162,938, filed Sep. 28, 2005, the entire contents of which is hereby incorporated by reference for all purposes into this application.

STATEMENT OF GOVERNMENT INTEREST

The United States Government has certain interests in the present invention.

FIELD OF INVENTION

The present invention relates to the field of high-speed optical data communications, and in particular, to all-optical methods and systems.

BACKGROUND

All-optical signal processing is a key to enabling all-optical networking. All-optical wavelength conversion (AOWC), for example, can be used to perform wavelength routing and contention resolution in transparent optical data networks. As a promising alternative to optical-electrical-optical (OEO) conversion, AOWC can reduce cost and power consumption in high-bit-rate core optical networks.

All-optical format conversion is another functionality needed in all-optical networks composed of multiple modulation formats. For example, all-optical on-off-keying (OOK) to phase-shift-keying (PSK) converters can seamlessly integrate OOK networks and PSK networks. All-optical OOK-to-PSK converters also can be beneficially used in all-optical pattern recognition circuits, as PSK is preferred for passive pattern recognition using all-optical correlators. Because of the constant intensity pattern of PSK formatted signals, PSK is preferable where semiconductor optical amplifiers (SOAs) are used as optical amplifiers.

All-optical logic operations, such as XOR, AND, OR, are an integral part in building all-optical data networks, where packet routing, data buffering, and wavelength conversion are expected to be processed in the optical plane. The XOR operation, for example, is particularly useful for label recognition and swapping, pattern generation, and parity checking. The XOR logic element is a key building block for pseudo-random binary sequence (PRBS) generators and optical half adders, for example.

Integrated semiconductor optical device technology is maturing and much research has been done in optical signal processing using the nonlinear optics in SOAs. However, the pattern dependence of SOAs owing to slow carrier recovery has been a key factor limiting the speed of all-optical logic operation based on semiconductor optical devices. Existing all-optical signal processing methods based on semiconductor optical devices, however, are better suited for OOK than PSK, as the dominant optical nonlinearity, such as cross gain modulation (XGM) or cross phase modulation (XPM), is mediated by intensity modulation and insensitive to the optical phase.

Efficient, all-optical signal processing methods that are applicable to multiple modulation formats, and that have reduced pattern dependence are desirable. For example, because of its superior performance in comparison to OOK, differential phase-shift-keying (DPSK) is increasingly recognized as a promising modulation format for high-bit-rate (e.g., $\geq 10$ Gb/s) optical transmission. Given the importance of DPSK for high-speed optical networks, an efficient method of AOWC for DPSK is highly desired. In contrast to the several methods of AOWC demonstrated for OOK, the few AOWC methods demonstrated for DPSK are based on four-wave mixing (FWM) in optical fibers or in a semiconductor optical amplifier (SOA). Intensity-dependent optical nonlinearities, such as cross gain modulation (XGM) and cross phase modulation (XPM), are usually considered inapplicable for AOWC of DPSK because of their phase insensitivity. FWM is highly polarization sensitive, however, and its conversion efficiency is typically less than the conversion efficiencies that have been achieved with XGM or XPM in SOAs. In addition, FWM in SOA also suffers from high OSNR degradation owing to the relatively high level of amplified spontaneous emission.

SUMMARY

In an exemplary embodiment, the present invention provides a method and system for the all-optical conversion of on-off-keying (OOK) formatted signals to phase-shift-keying (PSK) formatted signals. An exemplary embodiment of an OOK-to-PSK converter uses cross gain modulation (XGM) and cross phase modulation (XPM) in a differentially driven semiconductor optical amplifier (SOA) Mach-Zehnder Interferometer (MZI).

In a further aspect of the present invention, the exemplary OOK-to-PSK converter is used in an all-optical wavelength conversion (AOWC) system for differential phase shift keying (DPSK). An exemplary embodiment of a wavelength converter in accordance with the present invention comprises a silica planar lightwave circuit (PLC) delay-line interferometer (DI) front end that demodulates the input DPSK signal into an OOK binary data stream and its complement which differentially drive the OOK-to-PSK converter. All of the optical devices can be fabricated on an integrated platform.

In further aspects of the present invention, the OOK-to-PSK conversion method and system of the present invention can be used to implement a variety of all-optical logic functions, including, for example, an all-optical exclusive OR (XOR) and an all-optical pseudo-random binary sequence (PRBS) generator.

The present invention also enjoys reduced pattern dependence making it better suited than known approaches for use with semiconductor optical devices for applications requiring high bit-rate operation.

DESCRIPTION OF EMBODIMENTS

Figure 1:
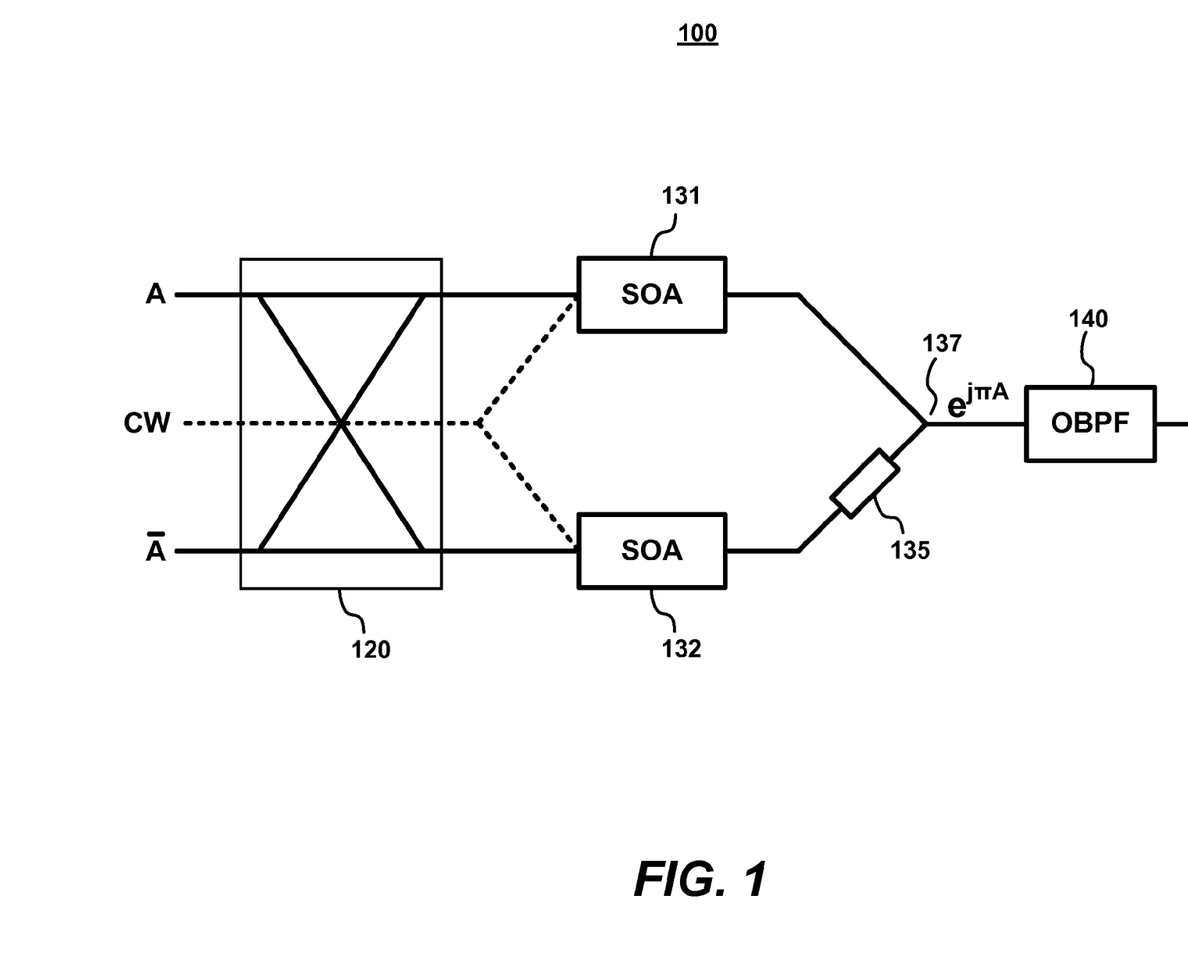
FIG. 1 is a schematic diagram of an exemplary embodiment of an all-optical, OOK-to-PSK converter in accordance with the present invention.

An exemplary embodiment of an all-optical on-off-keying (OOK) to phase-shift keying (PSK) converter 100 is schematically illustrated in FIG. 1. The converter 100 comprises a differential input stage 120 which is driven by an OOK format signal A and its complement ($\overline{A}$). A first output of the differential input stage 120 is coupled to a first semiconductor optical amplifier (SOA) 131 and a second output of the input stage 120 is coupled to a second SOA 132. The SOAs 131 and 132 are driven with the same continuous wave (CW) laser. The output of the second SOA 132 is coupled to a phase shifter 135 which provides a nominal phase shift of $\pi$ radians. The output of the phase shifter 135 and the output of the first SOA 131 are combined by a combiner 137 to provide the output of the converter 100.

In the exemplary embodiment, the SOA-MZI is implemented as a hybrid device fabricated by butt-coupling a bar of InP SOA arrays with input and output silica PLC waveguides. The differential input stage 120 can be implemented conventionally using fiber delay lines. Alternatively, a monolithically integrated device can be implemented in which the SOA-MZI and the differential input stage are fabricated on an InP device. The SOAs 131, 132, phase shifter 135 and combiner 137 can also be implemented using conventional components. These components can also be made integrated elements as well.

Note that although a continuous wave (CW) signal is shown as being provided to the SOAs, other periodic signals can be used as well, such as a train of optical pulses.

Figure 2A:
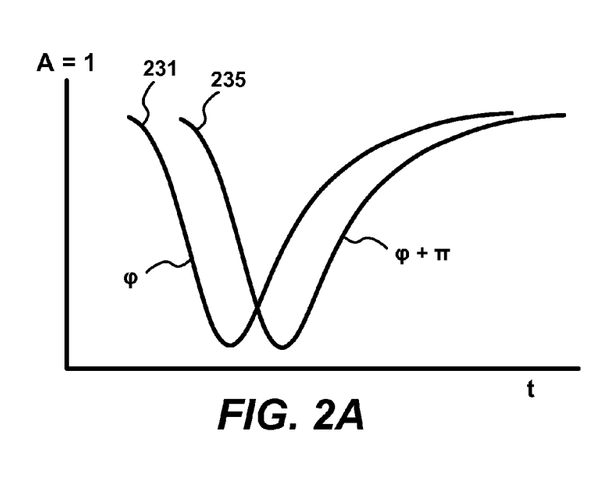
FIGS. 2A-2D show electric fields of the optical signals before the combiner and of the final output pulses from the converter of FIG. 1.
Figure 2B:
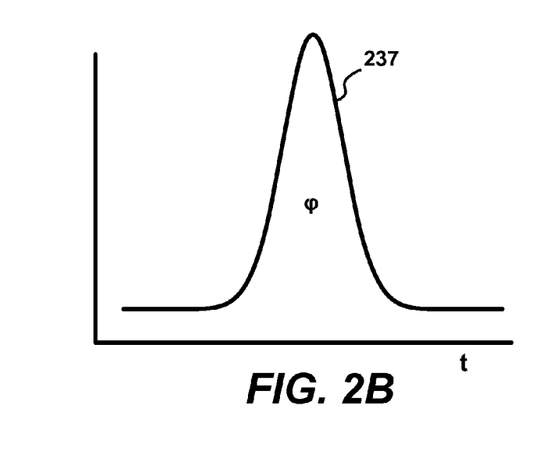

The operation of the OOK-to-PSK converter 100 will now be described with reference to FIGS. 2A-2D. When A=1, there will be a pulse at the A input and no pulse at the complementary input $\overline{A}$. The pulse at A is split and differentially delayed by the differential input stage 120 so that the pulse that is applied to the input of the second SOA 132 is delayed relative to the pulse that is applied to the first SOA 131. The differential delay ($\tau$) is substantially the same as the nominal width of an OOK pulse. For 40 Gb/s return-to-zero (RZ) OOK, for instance, an exemplary value for the differential delay is approximately 8 ps. The resultant amplitude of the electric field at the output of the first SOA 131 is shown in FIG. 2A as 231, whereas the resultant amplitude of the electric field at the output of the phase shifter 135 is shown in FIG. 2A as 235. The signal 231 has a phase $\phi$ whereas the signal 235 has a phase $\phi+\pi$. The phase $\phi$ is a non-linear phase shift due to cross-phase modulation (XPM) in SOAs. Due to the $\pi$-radian phase difference and the $\tau$ time difference between the signals 231 and 235, they are destructively combined by the combiner 137 to yield the output signal 237 (i.e., the amplitude of the electrical field at the output) shown in FIG. 2B. The resultant output signal 237 has a pulse duration of approximately $\tau$ and a phase $\phi$.

Figure 2C:
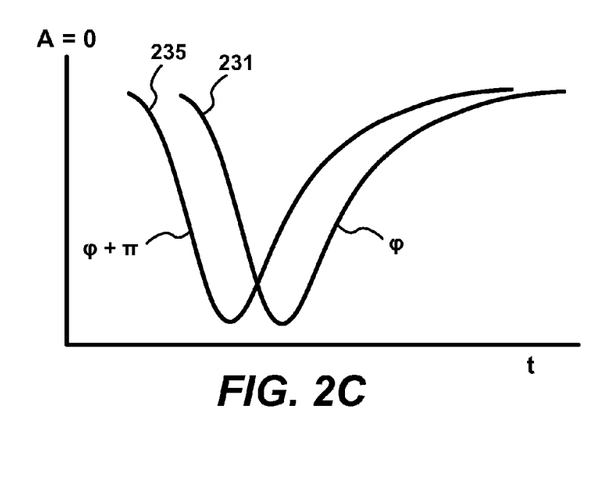
Figure 2D:
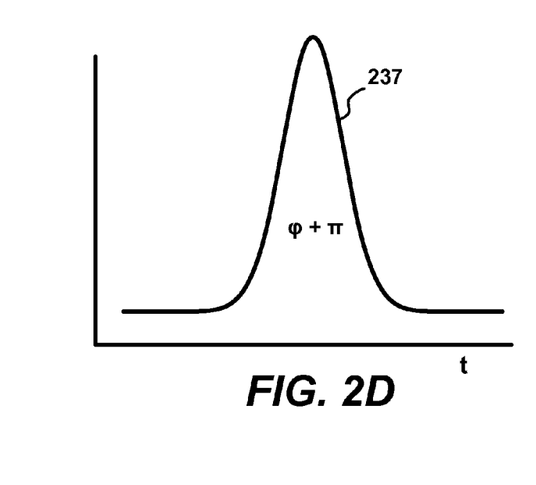

When A=0, there will be a pulse at the complementary input $\overline{A}$ of the converter 100 and no pulse at the input A. The pulse at $\overline{A}$ is split and differentially delayed by the differential input stage 120 so that the pulse that is applied to the input of the first SOA 131 is delayed relative to the pulse that is applied to the second SOA 132. The resultant amplitude of the electric field at the output of the first SOA 131 is shown in FIG. 2C as 231, whereas the resultant amplitude of the electric field at the output of the phase shifter 135 is shown in FIG. 2C as 235. The signal 231 has a phase $\phi$ whereas the signal 235 has a phase $\phi+\pi$. Due to the $\pi$-radian phase difference and the $\tau$ time difference between the signals 231 and 235, they are destructively combined by the combiner 137 to yield the output signal 237 shown in FIG. 2D. In this case, the resultant output signal 237 has a pulse duration of approximately $\tau$ and a phase $\phi+\pi$.

As such, when A=1 at the OOK input of the converter 100, the output of the converter 100 has a phase $\phi$, whereas when A=0 at the OOK input, the output has a phase $\phi+\pi$. The OOK formatted input is thus converted to a PSK formatted output.

As is well known, the input signals A, $\overline{A}$ will propagate through the SOAs and appear at the outputs of the SOAs. As such, the OOK input signals at the input of the converter 100 will appear to some extent at the output of the converter. One approach for addressing this feeding-forward of the input signals is to use a CW laser for the SOAs 131, 132 of a different wavelength ($\lambda 2$) than that of the input OOK signal ($\lambda 1$). An optical band pass filter (OBPF) 140 can be placed at the output to pass the PSK output modulated at the second wavelength $\lambda 2$ while blocking the OOK input signals at the first wavelength $\lambda 1$. In such an implementation, in addition to converting OOK to PSK, the converter 100 also acts as a wavelength converter (i.e., from $\lambda 1$ to $\lambda 2$). If wavelength conversion is not desired, other known techniques for eliminating the feeding forward of the input signals can be employed, such as using a CW laser of a different polarization, reversing the CW inputs and signal outputs of the SOAs, or using two cascaded wavelength converters, with the second wavelength converter recovering the original signal wavelength.

In a further exemplary embodiment in accordance with the present invention, the phase shifter 135 can be eliminated and the phase shift introduced by applying different bias currents and/or temperatures to the SOAs 131, 132.

In yet a further exemplary embodiment, the SOAs can be replaced by other nonlinear optical elements, including, for example, absorptive devices such as electro-absorption modulators.

An advantageous feature of the OOK-to-PSK converter of the present invention is its insensitivity to pattern dependence typically experienced by SOAs. As described above, both of the SOAs 131 and 132 receive an OOK pulse during each bit period, with the only variation between bit periods being the relative timing of the pulses. As such, pattern dependence is less of a concern in the OOK-to-PSK converter of the present invention thereby obviating the need to use faster SOAs that would be less prone to pattern dependence.

The OOK-to-PSK converter of the present invention can be used in a variety of applications. In a further aspect of the present invention, an all-optical wavelength converter (AOWC) is provided based on the OOK-to-PSK converter of the present invention.

Figure 3:
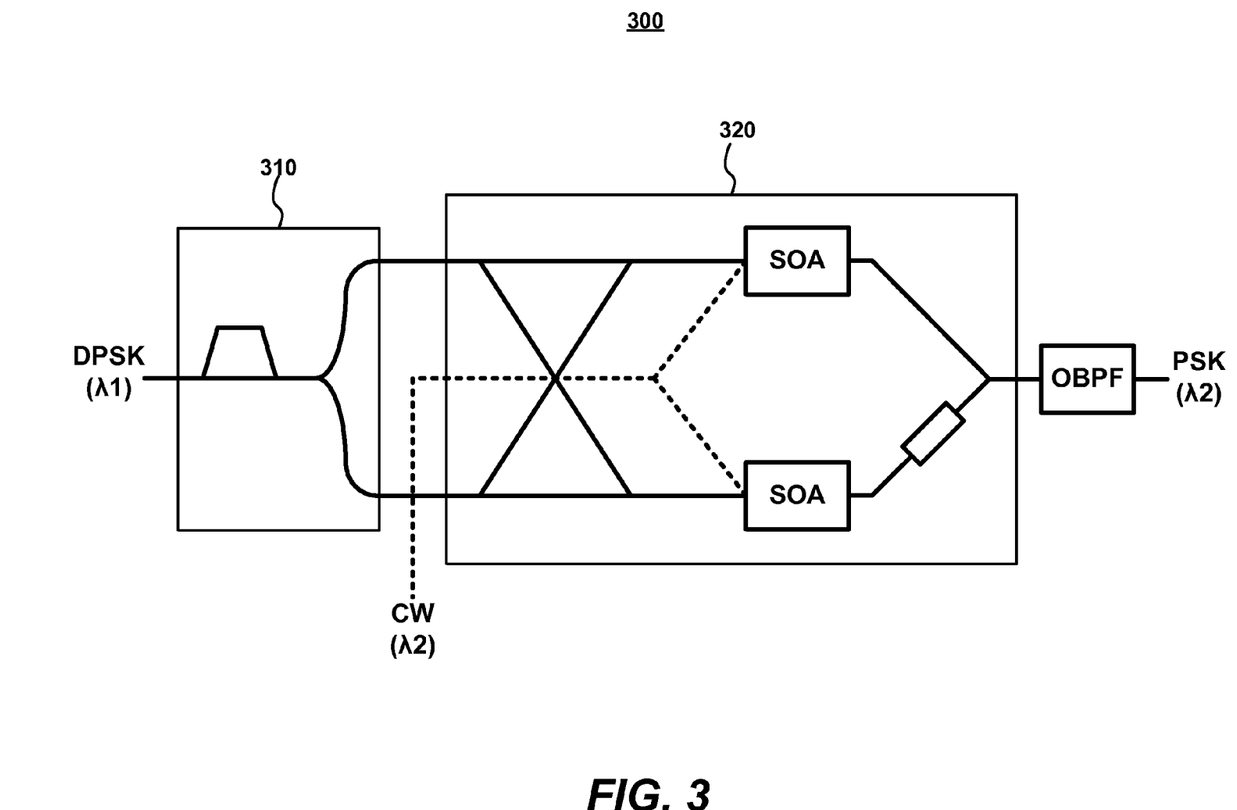
FIG. 3 shows an exemplary embodiment of an all-optical, DPSK wavelength converter in accordance with the present invention.

FIG. 3 is a schematic representation of an exemplary embodiment of a wavelength converter 300 for differential phase-shift keying (DPSK) formatted signals. The wavelength converter 300 comprises a one-bit delay interferometer (DI) 310 with differential outputs coupled to the inputs of an OOK-to-PSK converter 320 implemented as described above. The DI 310 can be implemented using a silica planar lightwave circuit (PLC) with a nominal delay of 25 ps for 40 Gb/s signaling.

When a DPSK formatted signal is applied to the input of the DI 310, it is converted to complementary OOK formatted signals at the output of the DI. The DI 310 thus acts as a DPSK-to-OOK converter. The complementary OOK outputs of the DI 310 then drive the OOK-to-PSK converter 320, which operates as described above to convert the OOK signals to PSK at its output. Wavelength conversion is carried out with the converter 300 by using a continuous wave (CW) in the OOK-to-PSK converter 320 of a wavelength λ2 that is different from the wavelength λ1 of the input DPSK signal. A conversion is thus carried out from a DPSK-modulated carrier of wavelength λ1 to a PSK-modulated carrier of wavelength λ2. Furthermore, as described above, the OOK-to-PSK converter 320 may include an OBPF at its output which passes the PSK signal modulated at the wavelength λ2 while blocking the OOK signals, which are modulated at the wavelength λ1. The two wavelengths are preferably selected to be within the gain bandwidth of the SOAs, and the OBPF should be selected so that the two wavelengths can be sufficiently separated. For example, 100 GHz separation would be sufficient to distinguish two 40-Gb/s signals of 8-ps RZ pulses. Precise separation will depend on how much linear cross talk can be tolerated in the transmission. The OBPF can be implemented in known ways.

As mentioned, the encoding of the data is altered by the wavelength converter 300 from DPSK to PSK. The data sequence Pn of the input DPSK signal and the data sequence Pn' of the wavelength converted output PSK signal are related as follows:

$$P_n' = P_n \oplus P_{n-1}, \text{ where } \oplus = \text{XOR}. \qquad (1)$$

Equivalently, if $D_n'$ is the data sequence that is ultimately derived from $P_n'$, the following relationship applies:

$$P_n = D_n' \oplus P_{n-2} \qquad (2)$$

Equation 2 thus shows how a DPSK formatted data stream should be pre-coded so that when it is processed by the converter 300, it will yield the desired data sequence at the receiver.

More generally, if N is the number of wavelength conversions expected between the transmitter and the receiver, the initial data sequence $P_n$ at the transmitter and the data Dn that is to be sent to the receiver are related as follows:

$$P_n = D_n \oplus P_{n-N-1} \qquad (3)$$

The change in data encoding can be addressed by either pre-coding, as described, or by post detection data processing.

Figure 4:
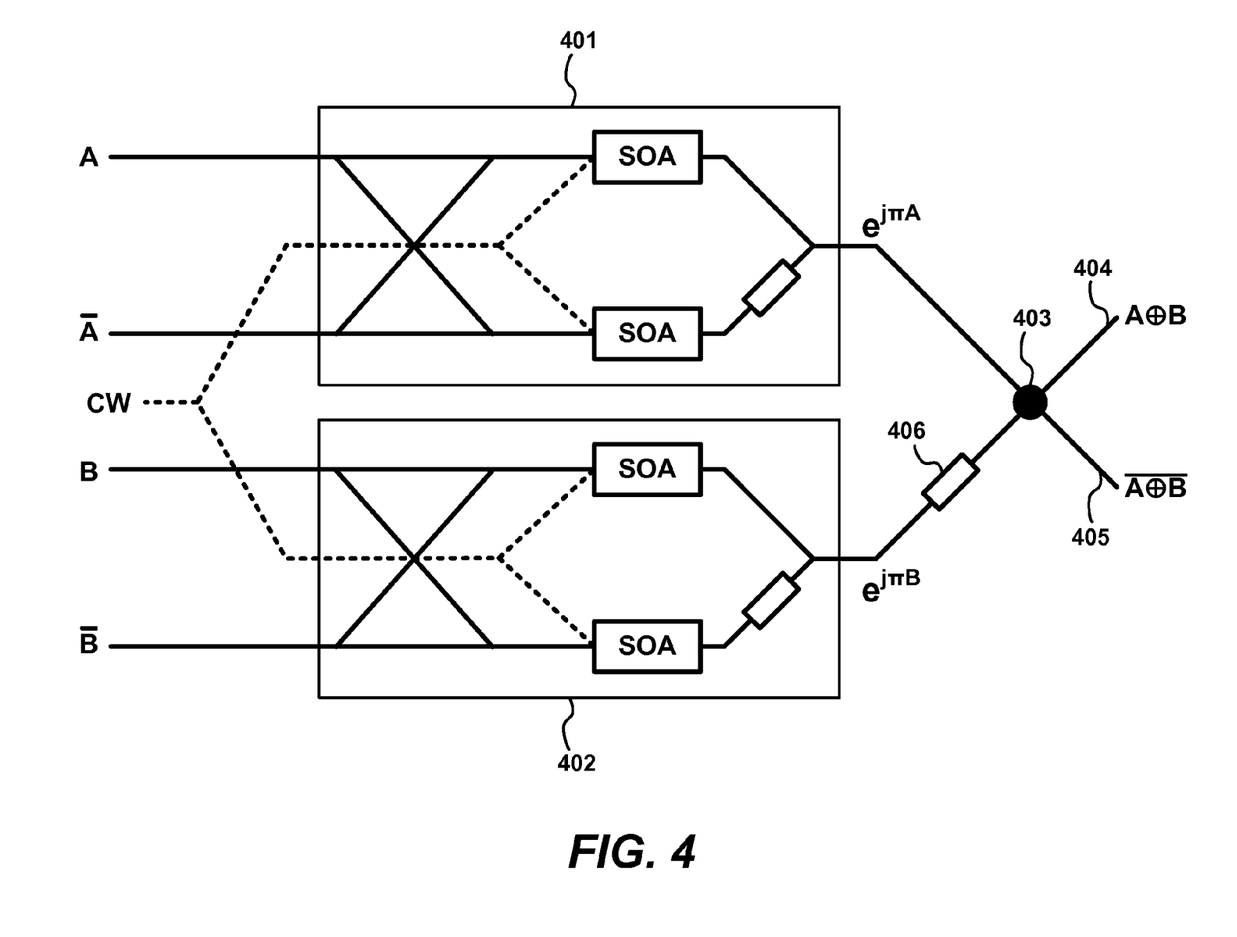
FIG. 4 shows an exemplary embodiment of an all-optical XOR gate in accordance with the present invention.

In a further aspect of the present invention, the OOK-to-PSK converter of the present invention can be used to implement all-optical logic, such as an all-optical exclusive OR (XOR) function. FIG. 4 shows an exemplary embodiment of an all-optical XOR logic block implemented using a first OOK-to-PSK converter 401 and a second OOK-to-PSK converter 402, in accordance with the present invention. A π-radian phase shifter 406 is coupled to the output of one of the OOK-to-PSK converters, in this case 402. The outputs of the converter 401 and of the phase shifter 406 are combined by a combiner 403. The combiner 403 has a destructive output port 404 and a constructive output port 405. The provision of complementary output ports provides for the ready cascadability of multiple logic blocks implemented as shown. Complementary inputs and outputs can also be obtained using inverters.

As described above, when both inputs A and B have the same value, the outputs of the OOK-to-PSK converters 401 and 402 will have the same phase. When combined by the combiner 403, the outputs of the converters 401 and 402 will therefore constructively interfere, leading to an output pulse at the constructive port 405 and no optical pulse at the destructive port 404. Conversely, when the inputs A and B have different values, the phases of the outputs of the OOK-to-PSK converters 401 and 402 will have a π radian difference, in which case they will destructively interfere when combined by the combiner 403, leading to an output pulse at the destructive port 404 and no optical pulse at the constructive port (405). As a result, A⊕B is output via port 404 and its complement (NXOR) is output via port 405.

In order to prevent the feed-forward of the input OOK signals A, $\overline{A}$ and B, $\overline{B}$, the OOK-to-PSK converters 401, 402 can be driven by a CW laser having a wavelength that differs from that with which the input signals are modulated. An OBPF for blocking the input signals while passing the output signals can be placed at the output of each converter 401, 402 or after the combiner 403. In the alternative, the other techniques mentioned above can also be employed.

It is well known in the art that the XOR function is a key logic element for many functionalities, including pseudo-random binary sequence (PRBS) generation, parity checking, and half addition, among others.

Optical PRBS can be generated using a linear optical shift register and feeding back the XOR result of the output at the end of the shift register and at least one tap point. An all-optical implementation of PRBS generation is described in A. J. Poustie, et al., "All-optical pseudorandom number generator," Optics Communication 159 (1999), pp. 208-214, where OOK XOR logic is implemented using SOA-based switching gates. However, no optical PRBS generator for other than OOK has been proposed before. In an exemplary embodiment, the present invention provides a multiple format (e.g., OOK and PSK) PRBS generator that enjoys reduced pattern dependence and hence the potential for a higher speed of operation.

Figure 5:
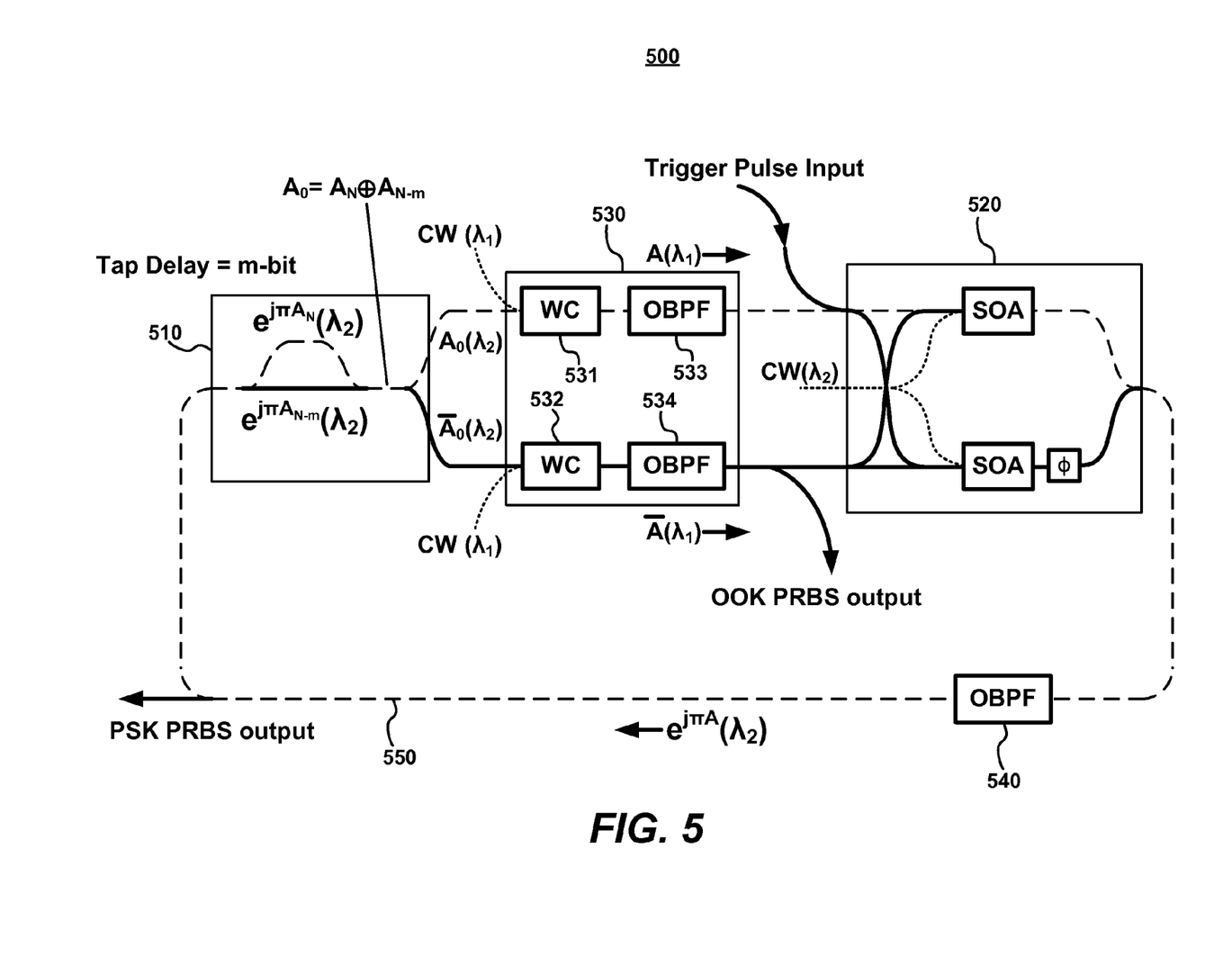
FIG. 5 shows an exemplary embodiment of an all-optical, dual-format PRBS generator in accordance with the present invention.

FIG. 5 shows a schematic representation of an exemplary embodiment of an all-optical PRBS generator 500 in accordance with the present invention. The PRBS generator 500 comprises an OOK-to-PSK converter 520, implemented as described above, whose output is coupled via a feedback loop 550 to a tap delay interferometer (DI) 510. The feedback loop 550 can be implemented, for example, with optical fiber. In the embodiment of FIG. 5, an optical band pass filter OBPF 540 is included at the output of the OOK-to-PSK converter 520.

The length of the shift register loop (shown in FIG. 5 as a dashed path) is equivalent to N bits and the temporal delay of the DI 510 is m bits. For example, N=15 and m=1 would generate a PRBS of length $2^{15}-1$.

The XOR operation between the output at the end of the feedback loop and the tap point of the tap delay is accomplished at the directional coupler at the output of the DI 510. Note that this XOR is a special case of the general XOR operation described above in connection with FIG. 4. In FIG. 4, XOR between two independent data signals A and B is accomplished by interfering two converted PSK signals $e^{j\pi A}$ and $e^{j\pi B}$. In the PRBS generator 500, the XOR is between two elements $A_N$ and $A_{N-m}$ of the same data sequence A. Hence, only one OOK-to-PSK converter 520 and a delay line interferometer 510 suffice to accomplish the operation.

The PRBS generator 500 may self-start from noise build-up within the circuit and generate non-maximal length (other than $2^N-1$) or maximal length ($2^N-1$) PRBS. Alternatively, the generator 500 may be forced to produce maximal length PRBS by applying a properly timed trigger pulse. A possible point for applying such a trigger pulse is the non-inverted input of the OOK-to-PSK converter 520, as shown in FIG. 5.

The output of the DI 510 is coupled to an OOK wavelength converter block 530, which is in turn coupled to the input of the OOK-to-PSK converter 520. The wavelength converter block 530 comprises a first all-optical OOK wavelength converter (WC) 531 coupled to the non-inverted output A of the DI 510 and a second all-optical WC 532 coupled to the complementary output A of the DI 510. The outputs of the WCs 531 and 532 are in turn, coupled to optical band pass filters (OBPF) 533 and 534, respectively.

The WCs 531 and 532 are driven by a CW laser of a first wavelength $\lambda_1$, whereas the OOK-to-PSK converter 520 is driven by a CW laser of a second wavelength $\lambda_2$. A PSK-formatted signal generated by the OOK-to-PSK converter 520 and fed-back via the feedback loop 550 to the DI 510 will have a wavelength of $\lambda_2$. The complementary OOK outputs A, $\overline{A}$ of the DI 510 will also have a wavelength of $\lambda_2$. The wavelength converters 531, 532 generate OOK formatted signals A, $\overline{A}$ modulated at the wavelength $\lambda_1$. Because the original signals A, $\overline{A}$ modulated at the wavelength $\lambda_2$ can feed-forward through the WCs 531, 532, the OBPFs 533 and 534 are included to pass the $\lambda_1$-modulated OOK signals A, $\overline{A}$ while blocking the $\lambda_2$-modulated OOK signals A, $\overline{A}$. Likewise, because the OOK signals A, $\overline{A}$ modulated at the wavelength $\lambda_1$ can feed-forward through the SOAs of the OOK-to-PSK converter 520, the OBPF 540 is provided to pass the $\lambda_2$-modulated PSK signal while blocking the $\lambda_1$-modulated OOK signals A, $\overline{A}$.

Note that an advantageous feature of the PRBS generator of the present invention is the ability to provide an output in either an OOK or a DPSK/PSK format. Points in the generator 500 from which OOK and PSK signals can be output are shown in FIG. 5. As such, the PRBS generator of the present invention can be referred to as a dual format all-optical PRBS generator.

Figures 6A, 6B, 6C:
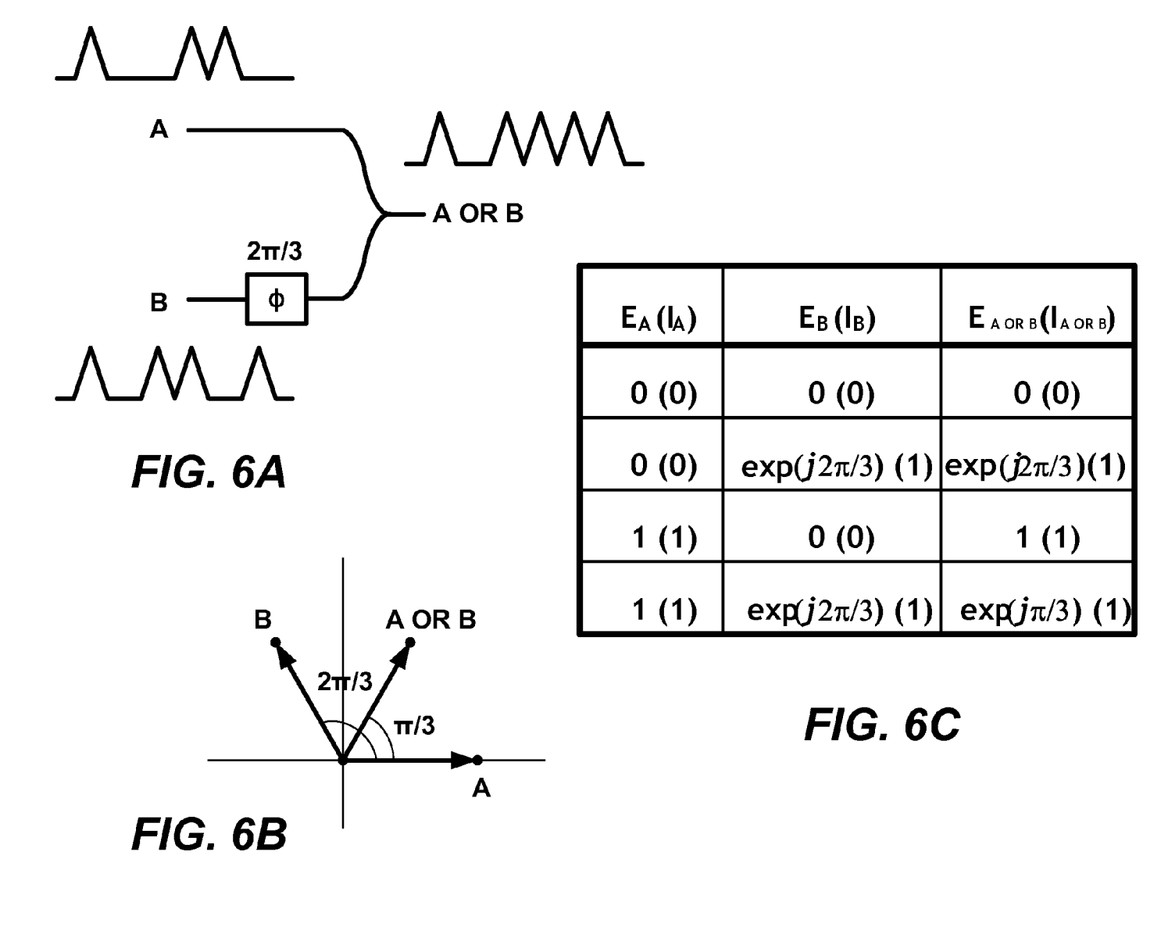
FIGS. 6A through 6C illustrate an OR logic function for optical on-off-keying (OOK) signals.

The principles of the present invention can also be applied to implement an all-optical OR operation. As illustrated in FIGS. 6A-6C, vector summation of the electric fields (E) of two OOK signals which are coherent and have the same wavelength, with a relative phase offset of 120° ($2\pi/3$ radians) achieves a binary OR operation of the intensity (I) or power of the two signals.

Figure 7:
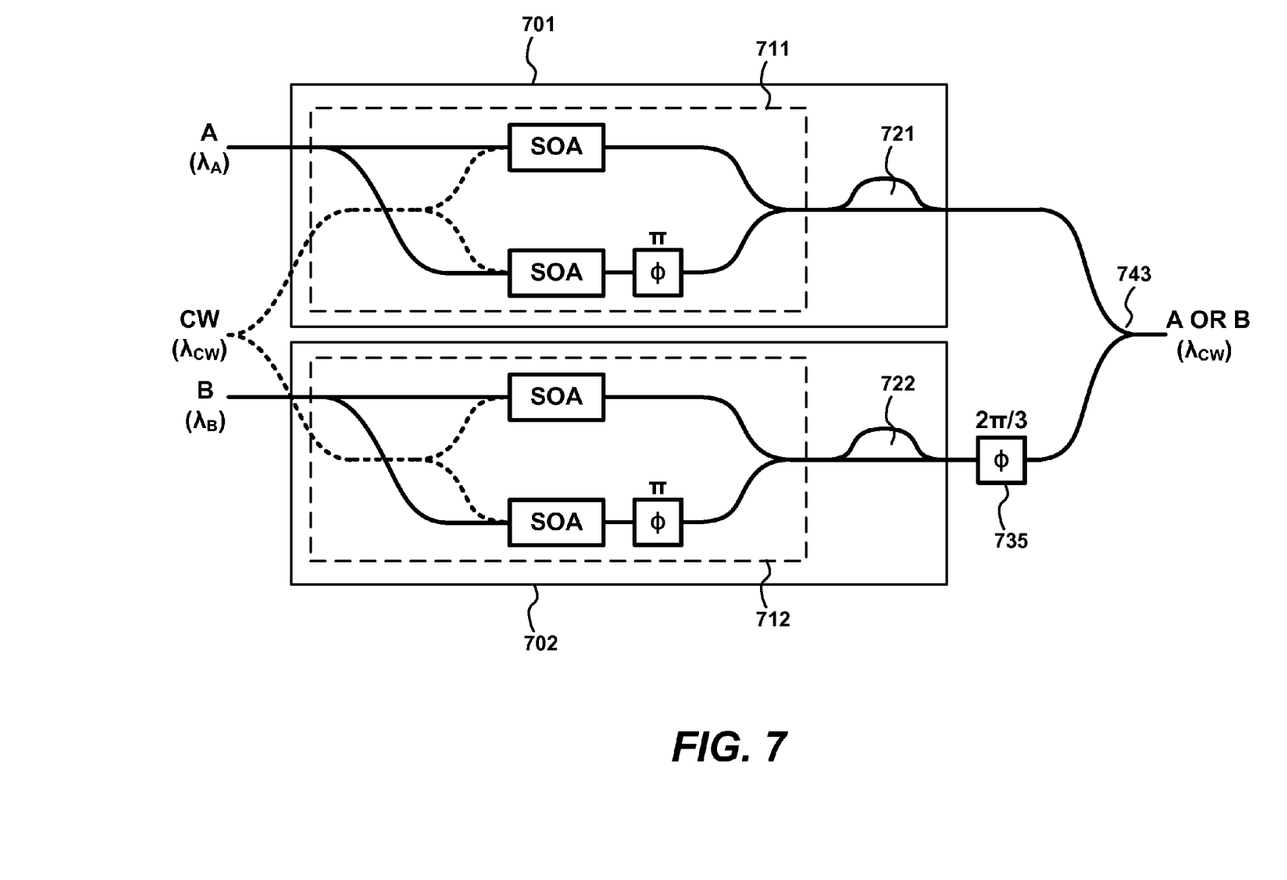
FIG. 7 shows an exemplary embodiment of an all-optical OR logic device in accordance with the present invention.

FIG. 7 shows an exemplary embodiment of an all-optical OR device 700 for two OOK signals which need not be coherent or have the same wavelength. The device 700 comprises first and second blocks 701 and 702 for converting the wavelengths of respective OOK input signals A and B to the wavelength of continuous wave signal CW applied thereto. Each block 701, 702 comprises a SOA-MZI structure 711, 712 followed by a filter 721, 722 tuned to block the wavelength of the respective OOK input signal. Each of the SOA-MZI structures 711, 712 is similar to the converter 100 shown in FIG. 1, except for the complementary input. The filters 721, 722 can be implemented as asymmetric MZ filters, for example. A 120° phase offset is introduced by phase shifter 735 coupled to the output of one of the filters 721, 722, in this case 722. The outputs of the filter 721 and of the phase shifter 735 are combined by a combiner 743 to generate an output signal representing an OR combination of the input signals.

Alternatively, the filters 721, 722 can be placed after the combiner 743. Depending on the difference between the wavelengths of the input signals, the filters 721, 722 can be replaced by one filter, after the combiner, capable of blocking both wavelengths, or where both input signals have the same wavelength, the one wavelength. Further filtering can be provided after the combiner 743 (by at least one of the aforementioned filters or an additional filter) to clean-up the output waveform if need be.

Figure 8:
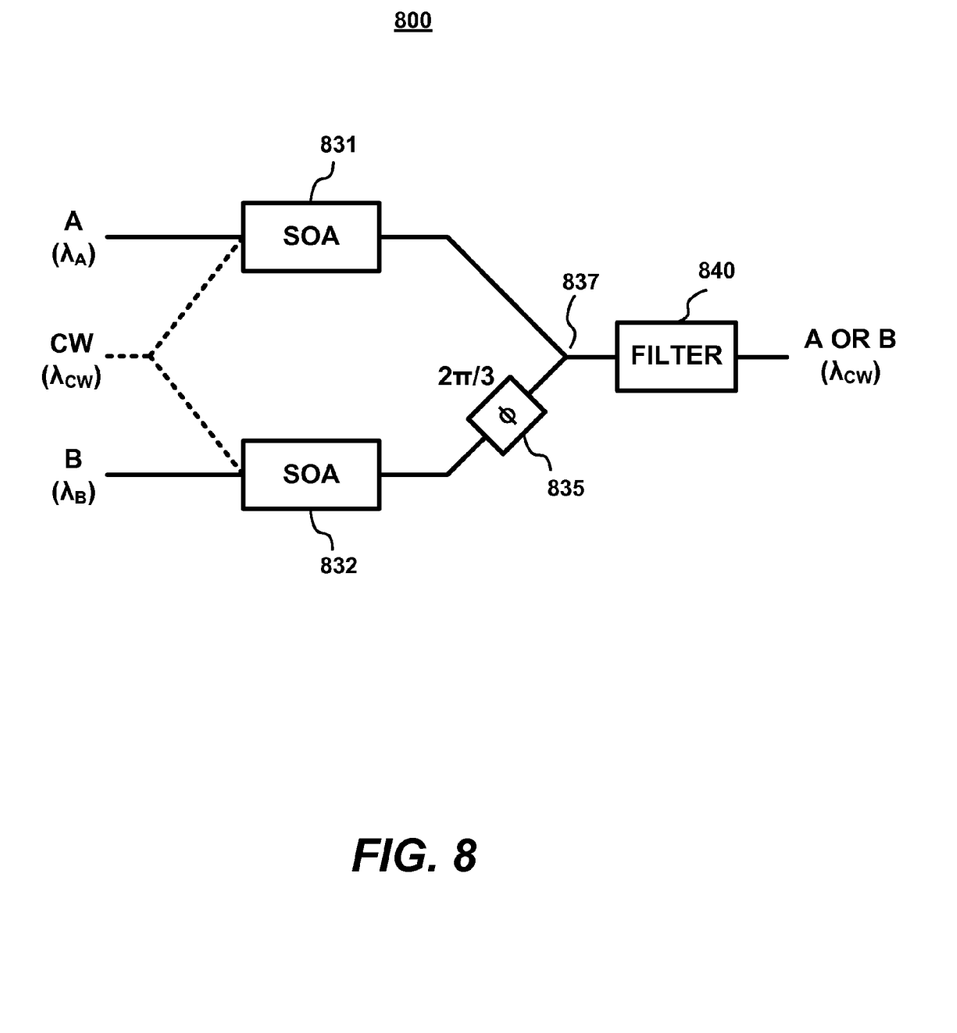
FIG. 8 shows a further exemplary embodiment of an all-optical OR logic device in accordance with the present invention.

FIG. 8 shows another exemplary embodiment of an OR logic device 800 comprising SOAs 831, 832 coupled to respective OOK input signals A and B and continuous wave signal CW. The 120° phase offset between the outputs of the SOAs 831, 832 is introduced by phase shifter 835 coupled to the output of SOA 832. The outputs of the SOA 831 and of the phase shifter 835 are combined by a combiner 837 to generate an output signal representing an OR combination of the input signals.

An optical filter 840 may be coupled to the output of the combiner 837 tuned to block signals about the wavelengths $\lambda_A$, $\lambda_B$ of the input signals while passing signals about the wavelength $\lambda_{CW}$ of the CW signal and/or to clean-up the output waveform, if need be. The filer 840 can be implemented using an optical bandpass filter, for example. Note that like the embodiment of FIG. 7, filtering to block the input signals may be provided before the combiner 837.

Note that the embodiment of FIG. 8 is preferably used for applications in which the data rate of the signals combined is sufficiently slow relative to the recovery speed of the SOAs. If that is not the case, however, the embodiment of FIG. 7 is better suited. Also, as with the other devices described, although a continuous wave (CW) signal is shown in FIGS. 7 and 8 as being provided to the SOAs, other periodic signals can be used as well, such as a train of optical pulses.

As can be appreciated by a person of ordinary skill in the art, there may be several equivalent topologies for implementing the various devices described above. For example, the order and orientation in which the various optical elements, e.g., SOAs, optical couplers, optical band pass filters, etc., are laid out can be altered to accomplish the substantially same functions. Any such equivalents are contemplated by and within the scope of the present invention.

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. An all-optical pseudo-random binary sequence (PRBS) generator comprising:
   an on-off-keying (OOK) to phase-shift-keying (PSK) converter;
   a delay interferometer;
   a wavelength conversion block, the wavelength conversion block arranged between the delay interferometer and the OOK-to-PSK converter; and
   a feedback loop, the feedback loop coupling an output of the OOK-to-PSK converter to an input of the delay interferometer.

2. The PRBS generator of claim 1 wherein the OOK-to-PSK converter includes:
   a first delay element, the first delay element delaying a first signal to generate a delayed first signal;
   a second delay element, the second delay element delaying a second signal to generate a delayed second signal, wherein the second signal is an inverse of the first signal so that when the first signal is in a first state, the second signal is in a second state and when the first signal is in the second state, the second signal is in the first state;
   a first nonlinear element, the first nonlinear element receiving the first signal, the delayed second signal, and a periodic optical signal;
   a second nonlinear element, the second nonlinear element receiving the second signal, the delayed first signal, and the periodic optical signal;

a phase shifter, the phase shifter introducing a phase offset between the output signals of the first and second nonlinear elements, the phase offset being substantially equal to $\pi$ radians; and a combiner, the combiner combining the phase-offset output signals of the first and second nonlinear elements.

3. The PRBS generator of claim 1 comprising:

an optical bandpass filter, the optical bandpass filter being arranged in the feedback loop between the output of the OOK-to-PSK converter and the input of the delay interferometer.

4. The PRBS generator of claim 1 comprising an OOK output.

5. The PRBS generator of claim 1 comprising a PSK output.

6. The PRBS generator of claim 1, wherein the delay interferometer includes a tap delay and a directional coupler, and wherein an XOR operation between an output of the feedback loop and a tap point of the tap delay is performed at the directional coupler.

7. The PRBS generator of claim 1, wherein the wavelength conversion block includes:

a first wavelength converter coupled to a non-inverted output of the delay interferometer;

a second wavelength converter coupled to an inverted output of the delay interferometer;

a first optical band pass filter coupled to an output of the first wavelength converter; and a second optical band pass filter coupled to an output of the second wavelength converter, wherein the first and second wavelength converters convert signals to a first wavelength from a second wavelength and the first and second optical band pass filters pass signals of the first wavelength and block signals of the second wavelength.

8. The PRBS generator of claim 7, wherein the OOK-to-PSK converter generates PSK signals of the second wavelength based on OOK signals of the first wavelength.

9. The PRBS generator of claim 2, wherein at least one of the first and second nonlinear elements includes a semiconductor optical amplifier.

* * * * *